Jan. 5, 1943.　　　　J. C. CROWLEY　　　　2,307,393
FITTING FOR STRATOSPHERE SUITS
Filed March 18, 1942　　　　2 Sheets-Sheet 1

INVENTOR.
JOHN C. CROWLEY
BY Kwis Hudson & Kent
ATTORNEYS

Jan. 5, 1943.  J. C. CROWLEY  2,307,393
FITTING FOR STRATOSPHERE SUITS
Filed March 18, 1942   2 Sheets-Sheet 2

INVENTOR.
JOHN C. CROWLEY
BY Kwis Hudson & Kent
ATTORNEYS

Patented Jan. 5, 1943

2,307,393

UNITED STATES PATENT OFFICE 2,307,393

FITTING FOR STRATOSPHERE SUITS

John C. Crowley, Cleveland Heights, Ohio, assignor to The Weber Dental Manufacturing Company, Canton, Ohio, a corporation of Ohio Application March 18, 1942, Serial No. 435,212

20 Claims. (Cl. 128—144)

This invention relates to a fitting for a stratosphere or similar suit.

Although the fitting embodying the present invention may be employed with special suits for use under various conditions, it is particularly useful in combination with a suit designed for the special use of persons entering the stratosphere, as, for example, the suits worn by aviators for flying in the stratosphere.

An object of the invention is to provide a fitting for a stratosphere or similar suit and which fitting is so constructed that all of the necessary connections can be made readily, simultaneously and efficiently to the various instrumentalities associated with the suit as, for example, suitable electrical connections and conduits for oxygen and hot air.

In suits worn by aviators for flying in the stratosphere it is generally necessary to provide at least six electrical connections on the suit; two of these connections are for the head phones for radio and intraplane telephone, two connections for the mouthpieces for the radio and telephone, and two connections for electrical heating elements located in various sections of the suit. A suit of this character also requires connections for placing the supply lines of oxygen and hot air into communication with the interior of the suit.

Another object of the invention is to provide a fitting for a stratosphere or similar suit and which fitting is so constructed as to enable the required electrical, oxygen and hot air connections to be made with the suit but if the wearer of the suit is forced to bail out of the plane the said connections will readily separate without allowing the escape of oxygen and hot air from the interior of the suit.

Further and additional objects and advantages will become apparent during the detailed description which is to follow of embodiments of the invention. Referring to the accompanying drawings, Fig. 1 is a sectional view through a fitting embodying the invention and which is shown with the two separable parts of the fitting assembled together and one of the parts attached to a stratosphere suit, only a portion of the suit being illustrated.

Figures 2, 3:
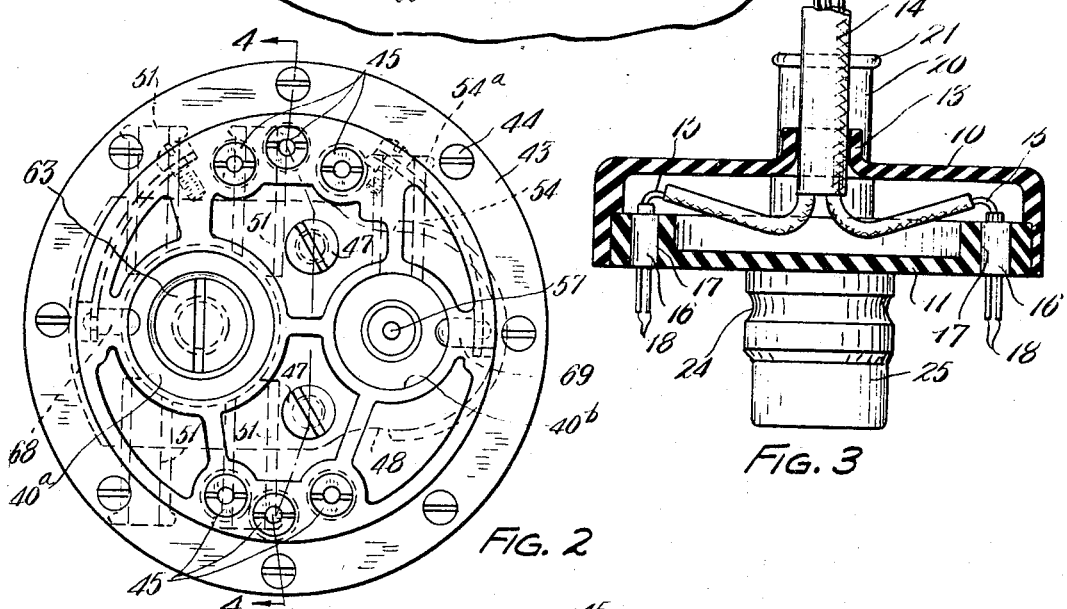
Fig. 2 is a plan view of that part of the fitting which is permanently attached to the stratosphere suit and is taken from line 2—2 of Fig. 1, looking in the direction of the arrows.
Fig. 3 is a view, partly in section and partly in side elevation, of that part of the fitting which is permanently connected to the plane and only temporarily associated with the part of the fitting that is permanently connected to the stratosphere suit.
Figure 4:
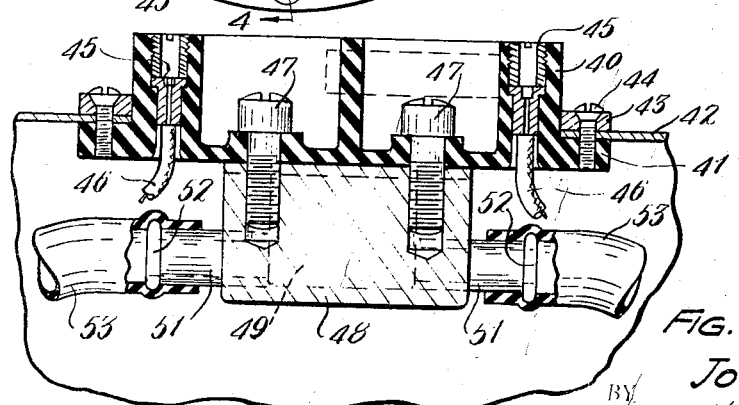
Fig. 4 is a sectional view taken on irregular line 4—4 of Fig. 2, looking in the direction of the arrows.

The part of the fitting which is permanently connected to the plane is shown detached in Fig. 3. from the part attached to the suit and comprises a housing member 10, the open end of which is closed by a suitable disk or plate 11 interfitting a shouldered annular recess of the interior wall of the member 10 and held in position by suitable means such as the screws 12.

Figure 1:
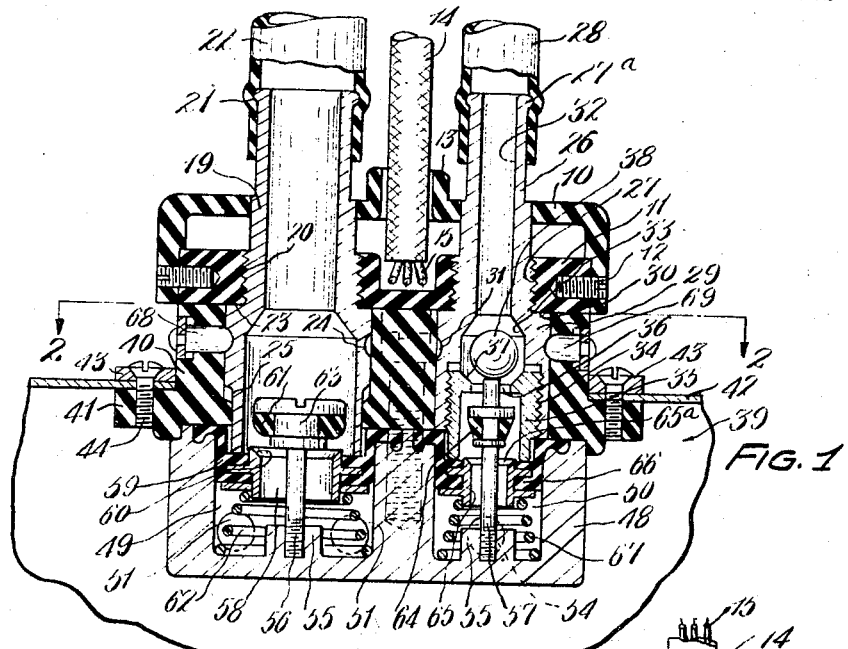

The member 10 on its outer side is provided with a boss 13 surrounding an opening through which extends a cable 14 which contains six electrical conduits 15, three of which are indicated in Figs. 1 and 3. Three of the electrical conduits 15 extend interiorly of the member 10 toward the side wall thereof and are electrically connected, respectively, to plugs 16 mounted in suitable openings formed in a portion 17 of the disk or plate 11. The plugs 16 on one side of the member 10 are three in number and each includes spaced contact fingers 18. The other three electrical conduits 15 extend interiorly of the member 10 and are electrically connected respectively to plugs 16 similarly mounted in and carried by the plate or disk 11 and located diametrically opposite the first mentioned group of plugs 16. In Fig. 3 only one plug 16 of each group of plugs is shown since the sectional view is taken along a line passing between the plugs of each group.

The member 10 on one side of the boss 13 is provided with an opening through which extends a tubular hot air connector 19 which is exteriorly screw-threaded, as indicated at 20, and screws into a threaded opening formed in a thickened portion of the plate or disk 11 so that said plate or disk 11 supports the connector 19. The upper end of the connector 19, as viewed in the drawings, is provided with an external bead or rib 21 for retaining a flexible hot air supply hose 22 in position on the end of the connector and in communication with the interior of the latter as will be well understood. The lower end of the connector 19 is of enlarged diameter, thus providing a shoulder 23 which contacts the lower or outer surface of the plate or disk 11. The connector 19 beneath the shoulder 23 is provided with an external annular groove 24 for a purpose later to be explained, while the extreme lower end of the connector is externally reduced, as indicated at 25, also for a purpose later to be explained. The bore through the connector is enlarged within the enlarged lower end portion of the connector, as clearly indicated in Fig. 1.

The part 10 is provided with a third opening located to the right of the boss 13, as viewed in Fig. 1, and through this third opening extends a second but somewhat smaller oxygen connector 26 which is externally threaded at 27 and screws into a threaded opening in the plate or disk 11 so as to be supported by the latter.

The connector 26 is provided at its upper end with an external annular bead or rib 27ᵃ for retaining a flexible oxygen supply hose 28 on and in communication with the connector 26, while the lower end 29 of the connector is of increased diameter and provides a shoulder 30 which engages against the lower or outer surface of the plate or disk 11.

The lower end 29 of the connector 26 is provided with an external annular groove 31 for a purpose later to be described. The connector 26 is provided with a bore 32 extending from the upper end of the connector to the enlarged lower portion of the latter, where said bore terminates in an enlarged portion 33. Below the enlarged portion 33 of the bore the connector 26 is provided with an enlarged counterbore which is threaded, as indicated at 34, to receive a retaining member 35 which screws into the counter bore but projects outwardly of the lower end of the connector 26. The retaining member 35 is substantially of inverted cup-shape and is provided in its closed end with an opening 36. The end wall of the retaining member 35 above the opening 36 is tapered, wherefore the retaining member completes the enlarged portion of the bore through the connector 26 and provides a tapered valve seat 37.

A ball valve 38 is mounted and returned in the enlarged portion of the bore through the connector 26 and may seat on the tapered valve seat 37 to close the opening in the retaining member 35 to prevent the escape of oxygen.

The member 10 and its associated elements which have just been described are connected to the plane through the flexible tubes 22 and 28 which extend to a source of supply of hot air and oxygen under pressure, respectively. The member 10 is also connected to the plane by the cable 14 which carries the six electrical conduits 15, it being understood that two of said conduits are connected to a source of electrical energy, while two of the conduits are connected to the plane's radio, and the remaining two conduits to the intraplane telephone system.

The part of the fitting which is attached to the stratosphere suit is indicated generally at 39. The part 39 comprises an annular member 40 provided with a suitable external flange 41. The member 40 extends through an opening in the stratosphere suit 42, with the latter clamped between the flange 41 and a clamping ring 43 by means of suitable screws 44. It will be understood that the connection between the member 40 and the stratosphere suit is a sealed connection, such that oxygen and air within the suit will not escape therefrom around the member 40.

The member 40 is provided with suitable recesses and openings to provide access to certain parts associated with the member as clearly indicated in the drawings. At diametrically opposite points the member 40 is provided with groups of three openings each through the member, to removably receive socket members 45 which are connected with electrical conduits 46 within the stratosphere suit. The socket members 45 receive the plugs 16 when the two parts of the fitting are properly connected together.

Secured to the underside of the member 40 by means of suitable securing bolts 47 is a housing 48 which is provided with a hot air chamber 49 and an oxygen chamber 50.

The housing 48 supports a plurality of conduits 51 which extend from and are in communication with the hot air chamber 49. The conduits 51 are provided with flanges or beads 52 for retaining on the conduits flexible hoses 53. The flexible hoses 53 connected to the conduits 51 extend within the stratosphere suit to various locations in the suit for the purpose of conducting hot air thereto. The housing 48 also supports a conduit indicated at 54 and which is in communication with the oxygen chamber 50 and extends therefrom outwardly beyond the housing 48. The outer end of the conduit 54 is provided with a bead or flange 54a, see Fig. 2, for retaining thereon a flexible hose (not shown) which leads within the stratosphere suit to the oxygen breathing device for the wearer and which device is mounted in said suit as will be understood.

The housing 48 centrally of the bottoms of the chambers 49 and 50 is provided with upstanding bosses 55 having tapped openings therein to allow rods 56 and 57 to be screwed into the bosses and extend rigidly and fixedly upwardly in the chambers 49 and 50, respectively. The rod 56 passes through an externally flanged sleeve 58 which is carried by a flexible diaphragm 59 clamped with a sealing engagement between the lower surface of the member 40 and the upper edge of the housing 48 and extending across the open end of the chamber 49. The upper or outer edge 60 of the sleeve 58 is beveled and is normally maintained against a gasket 61 in sealing relationship by means of a coil spring 62 surrounding the boss 55 and rod 56 in the chamber 49 and engaging a washer on the underside of the diaphragm 59. The gasket 61 is carried on the flanged head 63 at the outer end of the fixed rod 56 and which head is located in an opening 40a formed in the member 40 and adapted to receive the enlarged lower end of the hot air connector 19, as will later be pointed out.

It will be seen that the valve formed of the gasket 61 and the beveled edge 60 seals the opening in the sleeve 58 and normally closes communication with the chamber 49 from exteriorly of the stratosphere suit.

The fixed rod 57 is longer than the fixed rod 56 and extends outwardly of the chamber 50 into an opening 40b in the member 40 which is adapted to receive the lower end of the oxygen connector 26 as will later be pointed out. The fixed rod 57 intermediate its ends is provided with spaced flanges that support therebetween a sealing gasket 64. The fixed rod 57 below the gasket 64 passes through an externally flanged sleeve 65, the upper edge 65a of which is beveled so as to seat on the gasket 64 with a sealing engagement. The flanged sleeve 65 is carried by a flexible diaphragm 66 extending across the upper end of the chamber 50 and clamped with a sealing engagement between the upper edge of the housing 48 and the lower surface of the member 40. A coil spring 67 surrounds the boss 55 and rod 57 in the chamber 50 and abuts a washer on the underside of the diaphragm 66 and normally maintains the beveled upper edge 65a of the sleeve 65 in sealing contact with the gasket 64, thus closing the chamber 50 from communication with the exterior of the stratosphere suit.

The member 40 is provided with a suitable spring pressed plunger 68 mounted so as to extend radially into the opening 40a in the member 40 that receives the connector 19 and which plunger acts as the usual spring point. The member 40 is also provided with another spring pressed plunger or spring point 69 which extends radially into the opening 40b in the member 40 which receives the lower end of the connector 26.

As already explained the part 10 of the fitting is permanently connected with the airplane through the flexible hoses 22 and 28 and the cable 14, while the part 39 of the fitting is secured to the stratosphere suit 42.

When the wearer of the stratosphere suit wishes to connect the part 10 of the fitting with the part 39 he inserts the lower ends of the connectors 19 and 26 into the openings 40a and 40b provided therefor in the member 40 of the part 39 until the spring points 68 and 69 snap into the grooves 24 and 31 formed, respectively, in the lower ends of the connectors 19 and 26. The spring points 68 and 69 thus frictionally retain the connectors 19 and 26 in the openings 40a and 40b.

The free edge of the reduced end 25 of the connector 19 when thus inserted in the opening 40a extends below the inner surface of the member 40 and sealingly engages the diaphragm 59 and distorts the latter inwardly of the chamber 49 against the action of the spring 62 to unseat the beveled upper edge 60 of the sleeve 58 with respect to the gasket or valve 61 carried by the fixed rod 56. At this time hot air is free to pass from the connector 19 through the sleeve 58 into the chamber 49 and thence through the conduits 51 and flexible hoses 53 to various locations in the interior of the stratosphere suit. It will be understood that the hose 22 is connected with a suitable source of supply of hot air.

When the connector 26 is inserted into the opening 40b in the member 40 until the spring point 69 snaps into the groove 31 the upper end of the fixed rod 57 passes through the opening 36 in the retaining member 35 and engages the ball valve 38 to raise the latter from the tapered seat 37. At this time also the lower edge of the retaining member 35 sealingly engages the diaphragm 66 and distorts the latter against the action of the spring 67 to move the beveled upper edge 65a of the sleeve 65 out of contact with the gasket or valve 64 carried by the fixed rod 57, as clearly shown in Fig. 1.

It will be evident that now oxygen under pressure is free to flow through the connector 26 and through the sleeve 65 into the chamber 50 from whence it passes through the conduit 54 and the flexible hose connected therewith to the oxygen breathing device (not shown) carried by the stratosphere suit. It will be understood that the hose 28 is connected with a suitable source of supply of oxygen under pressure, such as an oxygen tank.

In mounting the part 10 of the fitting on the part 39, as just explained, the contact fingers 18 of the three plugs 16 of each group of plugs extend into the three socket members 45 of each group of socket members and electrically connect the six leads or conduits 15 with the six leads or conduits 46 within the stratosphere suit. It will be recalled that two of the leads or conduits 15 are connected with a source of electrical energy, while two of the leads or conduits 46 are connected with electrical heating elements located within the stratosphere suit. It will be further recalled that two of the leads or conduits 15 are connected with the intraplane telephone system, while two of the leads 46 are connected respectively within the suit to the mouthpiece and the earphone of the intraplane telephone. In addition the remaining two leads or conduits 15 are connected to the radio carried by the plane, while the remaining two leads or conduits 46 extend, respectively, to the mouthpiece and the earphone carried by the suit for the radio.

It will be seen that the fitting which has now been completely described provides all of the necessary electrical connections, as well as the required hot air and oxygen connections to the stratosphere suit.

Assuming that the two separable parts of the fitting are interconnected and the wearer of the suit desires to separate the part 10 of the fitting from the part 39, it is only necessary for him to move the part 10 away from the part 39 with sufficient force to overcome the spring action of the spring points 68 and 69 to disengage the connectors 19 and 26 from the member 40 and also to disengage the spring contact fingers 18 from the socket members 45. As soon as the connectors 19 and 26 have been moved outwardly of the openings 40a and 40b in the member 40 to disengage the lower ends of the connectors with respect to the diaphragms 59 and 66 the springs 62 and 67 restore said diaphragms to their original positions wherein the beveled upper edges 60 and 65a of the sleeves 58 and 65 sealingly engage the valves or gaskets 61 and 64, respectively, thus preventing escape of hot air and oxygen from the stratosphere suit to the external atmosphere.

It will also be noted that the disengaging movement of the part 10 relative to the part 39 moves the upper end of the fixed rod 57 out of engagement with the ball valve 38 and permits said valve to sealingly contact the tapered valve seat 37 on the retaining member 35 under the pressure of the oxygen in the connector 26 to thereby prevent the loss of oxygen from the oxygen supply tank to which the hose 28 is connected.

In case of an emergency if the wearer of the stratosphere suit bails or jumps out of the plane without disconnecting the parts of the fitting because of the lack of time or through forgetfulness, the force of his movement out of the plane will accomplish this disconnection automatically.

Figure 5:
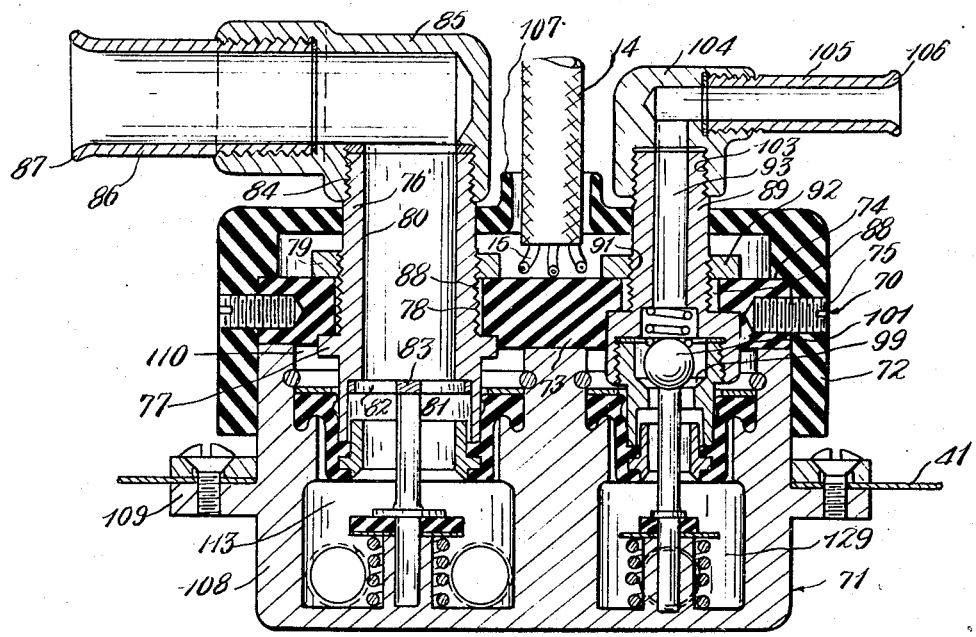
Fig. 5 is a view similar to Fig. 1 but showing a different form of fitting embodying the invention than is shown in Fig. 1.
Figure 6:
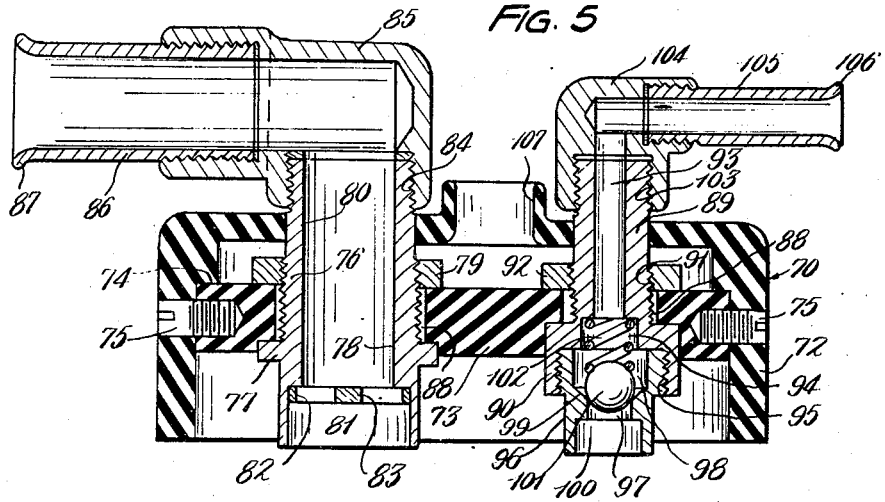
Fig. 6 is a sectional view of that part of the fitting shown in Fig. 5 which is permanently connected to the plane and is only temporarily associated with the part of the fitting that is permanently connected to the stratosphere suit.
Figure 7:
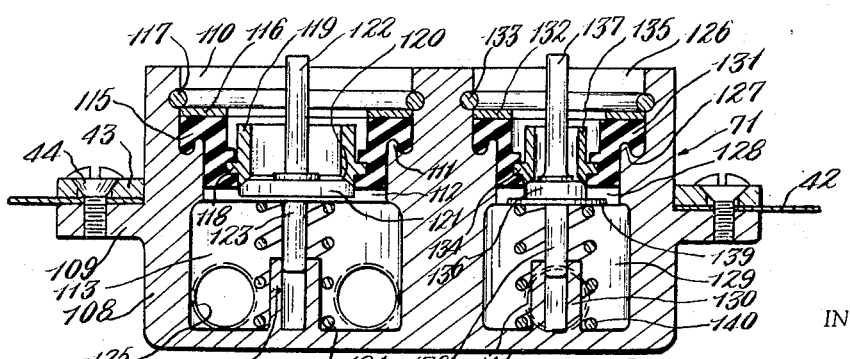
Fig. 7 is a sectional view through that part of the fitting shown in Fig. 5 which is permanently connected to the stratosphere suit.

In Figs. 5, 6 and 7 a different form of fitting embodying the invention is illustrated than is shown in Figs. 1 to 4 inclusive. However, the fitting shown in Figs. 5 to 7 functions in substantially the same manner as the previously described form of the fitting but differs therefrom merely in its structural make-up. As in the previously described form the fitting now to be described and illustrated in said Figs. 5 to 7 inclusive comprises two separable parts, namely, the part 70 which is connected to the plane and the part 71 which is secured to the stratosphere suit 42 in sealed relation thereto.

The part 70 comprises a housing 72 within which is located a supporting plate 73. The supporting plate bears against an internal shoulder 74 in the housing 72 and is held in position in the housing by means of one or more set screws 75 extending through the wall of the housing and engaging in recesses formed in the supporting plate 73. The housing 72 is provided in its closed end with an opening aligning with an opening in the supporting plate 73 and a tubular connector 76 extends through these openings.

The connector 76 is provided with an external flange 77 and above this flange with an exteriorly threaded portion 78 which passes through the opening in the supporting plate 73 and above the same. A clamp nut 79 screwed on the externally threaded portion 78 of the connector serves to draw the flange 77 into tight engagement with the supporting plate 73 and to hold the connector 76 in position in said plate and in the housing 72. The connector 76 is provided with a bore 80 and at its lower end with an enlarged counterbore 81, while a ring 82 is mounted internally of the connector and bears against the shoulder provided at the inner end of the counterbore 81. The ring 82 has a cross piece 83 extending diametrically of the ring for a purpose later to be explained. The outer end of the connector 76 beyond the closed end of the housing 72 is externally threaded, as indicated at 84, and said outer end of the connector screws into a threaded socket formed in an elbow 85.

The elbow 85 has a second threaded socket into which screws a connecting sleeve 86 provided on its outer end with an outwardly flared portion 87 which acts to retain on the sleeve a flexible hot air supply hose (not shown) similar to the hose 22 in the previously described form of the invention.

The housing 72 is provided with another opening located in alignment with an opening 88 in the supporting plate 73. A connector 89 extends through these aligned openings in the housing and the supporting plate 73 and said connector is provided at its inner end with an enlarged portion 90 above which the connector has an externally threaded portion 91 extending through the opening 88 in the supporting plate 73. The connector 89 is held in position in the openings in the housing and supporting plate by means of a nut 92 screwed on the externally threaded portion 91 of the supporting plate and drawing the enlarged portion 90 of the connector into tight engagement with the shoulder formed by the enlarged counterbore at one end of the opening 88. The connector 89 is provided with a bore 93 which at its inner end communicates with a counterbore 94, in turn communicating with a threaded counterbore 95 in the enlarged portion 90 of the connector. A retaining member 96 has its enlarged externally threaded end portion screwed into the threaded counterbore 95 as indicated in Fig. 6. This retaining member is provided intermediate its ends with a bore 97 communicating with an enlarged counterbore 98, the bottom of which is conical as indicated at 99. The bore 97 also communicates with a counterbore 100 located in the free end of the retaining member 96. A ball valve 101 is located in the retaining member 96 and is normally held seated on the conical bottom surface 99 of the counterbore 98 by a coil spring 102 which abuts the bottom of the counterbore 94 as clearly shown in Fig. 6.

The connector 89 extends beyond the closed end of the housing 72 and is provided with an externally threaded portion 103 that screws into a threaded socket formed in an elbow 104. The elbow 104 is provided with a second threaded socket into which screws the externally threaded end of a connecting sleeve 105 flared at its opposite end 106 for retaining thereon a flexible oxygen supply hose (not shown) similar to the hose 28 previously referred to.

In assembling the elements of the parts 70 the connectors 76 and 89 without the elbows 85 and 104 attached thereto, are mounted and clamped in position in the openings 78 and 88, respectively, of the supporting plate 73 before said plate is mounted in position in the housing 72. The supporting plate 73 with the connectors mounted thereon is then assembled in the housing 72 and the connectors passed through the openings in the closed end of the housing, after which the elbows 85 and 104 can be secured to the outer ends of the connectors.

The housing 72 at its closed end is provided with a boss 107, similar to the boss 13 and surrounding an opening through which extends the cable 14, previously referred to, and which cable contains electrical conduits 15, three of which are shown in Fig. 5. As in the previously described form of fitting, three of the electrical conduits 15 extend interiorly of the housing toward the side wall thereof and are electrically connected, respectively, to plugs 16 (previously illustrated but not shown in Figs. 5 to 7) mounted in suitable openings formed in the supporting plate 73. The plugs 16 each includes spaced contact fingers 18. The other electrical conduits 15 carried by the cable 14 extend interiorly of the part 70 and are electrically connected, respectively, to similar plugs 16 mounted in and carried by the supporting plate 73 in a corresponding manner. Inasmuch as the electrical connections have been fully illustrated and described in connection with the form of fitting shown in Figs. 1 to 4 inclusive, these connections have not been illustrated in the fitting of Figs. 5 to 7 inclusive.

The part 71 comprises a housing 108 provided intermediate its ends with an external flange 109 corresponding to the flange 41 in the previously described form and serving the purpose of cooperating with the washer ring 43 and the screws 44 to enable the part 71 to be attached to the stratosphere suit in sealed relation therewith. The housing 108 is of a diameter such that it telescopes within the housing 72 below the supporting plate 73 as clearly indicated in Fig. 5.

The housing 108 is provided at its upper end, as viewed in the drawings, with a recess 110, the bottom of which has an upstanding continuous bead 111 spaced from the wall of the recess. The recess 110 at its inner end communicates with a bore 112 which, in turn, communicates at its inner end with a recess or chamber 113 the bottom of which is provided with a centrally disposed upstanding integral guide sleeve 114. A flexible member 115 extends over the bead 111 and into the space between the bead and the wall of the recess 110 and is clamped in position therein by a washer 116 and a wire clamping spring 117 mounted in a groove formed in the wall of the recess 110 as clearly shown in Fig. 7. The flexible member extends inwardly of the bore 112 and has a centrally disposed opening therein, the wall of which is provided with ribs embracing and secured to the external flange 118 of a sleeve 119 supported by the member 115 in sealed relationship thereto. The inner end of the sleeve 119 is of conical shape, as indicated at 120 in Fig. 7.

A valve member 121 normally seats on the conical end 120 of the sleeve 119 to close the opening through said sleeve. The valve member 121 is mounted on a valve pin which has an elongated portion 122 extending outwardly through the sleeve 119 and the recess 110. The valve pin also inwardly of the valve member 121 has a somewhat shorter portion 123 which extends into the guide sleeve 114. A coil spring 124 located in the chamber 113 in surrounding relation to the guide sleeve 114 engages the inner side of the valve member 121 and normally maintains the latter in seated relationship on the conical end 120 of the sleeve 119.

The chamber 113 communicates with a plurality of conduits indicated at 125 and similar to the conduits 51 previously described and which conduits are connected with flexible hoses that extend within the stratosphere suit to various locations in the suit for the purpose of conducting hot air thereto.

The housing 108 is also provided with a recess 126 the bottom of which has an upstanding bead or flange 127 spaced from the wall of the recess. The recess 126 communicates with a bore 128 in the housing and said bore in turn communicates with an oxygen chamber 129 having on its bottom wall a centrally disposed integral upstanding guide sleeve 130. A flexible member 131 similar to the flexible member 115 previously described extends over the bead 127 and is clamped in the recess 126 by the ring washer 132 and the wire clamping spring 133 located in a groove formed in the wall of the recess 126. The flexible member 131 extends inwardly of the bore 128 and is provided with a central opening, the wall of which has spaced flanges which grip and are secured to an external flange 134 formed on a sleeve 135, the inner end of which is of conical shape and is normally engaged by a valve member 136.

The valve 136 is mounted on a valve pin which has a portion 137 extending outwardly through the sleeve 135 and the recess 126 and another portion 138 located below the valve 136 and a washer 139 and said portion 138 extends into the guide sleeve 130. A coil spring 140 is located in the chamber 129 and surrounds the guide sleeve 130 and abuts the washer 139 and normally maintains the valve 136 seated against the conical inner end of the sleeve 135. A conduit indicated at 141 and similar to the conduit 54 previously described communicates with the chamber 129 and is connected with a flexible hose (not shown) which leads within the stratosphere suit to the oxygen breathing device for the wearer and which device is mounted in said suit as will be well understood.

It will be understood that the part 71 is provided with groups of openings that removably receive the socket members 45 (previously described), which, in turn, are connected with electrical conduits within the stratosphere suit and said socket members receive the plug 16 when the two parts of the fitting are properly connected together.

In Fig. 5 the part 71 and the part 72 of the fitting are illustrated assembled together and at such time it will be seen that the inner end of the connectors 76 and 89 telescope over the sleeves 119 and 135, respectively, until they engage the flexible members 115 and 131. However, at the time that the inner ends of the connectors 76 and 89 have engaged the flexible members the cross piece 83 of the ring 82 in the connector 76 has engaged the end of the portion 122 of the valve pin and moved the latter and the valve 121 inwardly against the action of the spring 124 to the position shown in Fig. 5, at which time said valve is unseated and the connector 76 is in communication with the chamber 113. Also at this time the end of the portion 137 of the valve pin which carries the valve 136 has engaged the ball valve 101 and unseated the latter against the action of its spring and said ball valve, in turn, when thus unseated has reacted against the valve pin to move the latter against the action of its spring to unseated position as shown in Fig. 5, at which time the bore 93 through the conductor 89 is in communication with the oxygen chamber 129.

It will be understood that suitable means such as spring points may be provided, if desirable, for frictionally holding the parts 71 and 72 in assembled relationship.

The form of fitting shown in Figs. 5 to 7 functions in a comparable manner to the form of fitting described in connection with Figs. 1 to 4 inclusive and accomplishes comparable results and therefore it is not believed necessary to repeat herein in further detail the mode of operation or the results accomplished by the fitting shown in Figs. 5 to 7.

Although several embodiments of the invention have been illustrated and described herein it should be understood that the invention is susceptible of various modifications and adaptations within the scope of the appended claims.

Having thus described my invention, I claim:

1. A fitting of the character described comprising two separable parts, one of said parts being adapted to be attached in sealed relationship with a stratosphere or similar suit and having a chamber therein in communication with the interior of said suit, means normally closing said chamber from communication with the exterior of said suit and including a flexible diaphragm, a sleeve carried by said diaphragm, and a fixed valve element engaged by an edge of said sleeve to seal the latter; said other part having a tubular connector acting when said parts are placed together to sealingly engage said diaphragm and distort the latter to unseat said sleeve edge and fixed valve element whereupon said connector is in communication with said chamber, said parts having cooperating means releasably maintaining the same in placed together relationship.

2. A fitting of the character described comprising two separable parts, one of said parts being adapted to be attached in sealed relationship with a stratosphere or similar suit and having a plurality of chambers therein in communication with the interior of said suit, means normally closing said chambers from communication with the exterior of said suit and including flexible diaphragms extending across said chambers, sleeves carried by said diaphragms, and fixed valve elements engaged by an edge of said sleeves to seal the latter; said other part having tubular connectors acting when said parts are placed together to sealingly engage said diaphragms and distort the latter to unseat said sleeve edges and fixed valve elements whereupon said connectors are in communication with said chambers, said parts having cooperating means releasably maintaining the same in placed together relationship.

3. A fitting of the character described comprising two separable parts, one of said parts being adapted to be attached in sealed relationship with a stratosphere or similar suit, said part having a chamber therein communicating with the interior of said suit and also being provided with an opening aligning with said chamber and extending inwardly from the outer side of said part, a flexible diaphragm extending across said chamber inwardly of said opening, a sleeve carried by said diaphragm, a fixed valve element carried by said part and normally engaged by an edge of said sleeve to close the latter, said other part supporting a tubular connector extending through the same and projecting, when said parts are placed together, into said opening and sealingly engaging the diaphragm and distorting the same to unseat said sleeve edge and said valve element, said parts having cooperating releasable means for maintaining the parts in placed together relationship.

4. A fitting of the character described comprising two separable parts, one of said parts being adapted to be attached in sealed relationship with a stratosphere or similar suit and having a chamber therein in communication with the interior of said suit, means normally closing said chamber from communication with the exterior of said suit and including a flexible member, a sleeve carried by said flexible member, and a valve element engaged by an edge of said sleeve to seal the latter; said other part having a tubular connector acting when said parts are placed together to sealingly engage said flexible member and to unseat said valve element and sleeve edge whereupon said connector is in communication with said chamber.

5. A fitting of the character described comprising two separable parts, one of which is operatively attached to a stratosphere or similar suit, one of said parts being provided with a plurality of electrical sockets adapted to be connected to leads and the other of said parts having a plurality of electrical plugs connected to leads and operatively engaging in said sockets when said parts are placed together, the said part other than the part connected to the suit being connected by a conduit to a fluid supply source, said parts having cooperating means releasably interconnecting the parts and placing the interior of the suit in communication with said conduit, said cooperating means including a flexible diaphragm, a sleeve carried thereby and a fixed valve element engaged by an edge of said sleeve to seal the latter and all carried by one of said parts; a tubular connector carried by the other of said parts and acting when said parts are interconnected to sealingly engage said diaphragm and distort the latter to unseat said sleeve edge and fixed valve element.

6. A fitting of the character described comprising two separable parts, one of said parts being adapted to be attached in sealed relationship with a stratosphere or similar suit and having a chamber therein in communication with the interior of said suit, means normally closing said chamber from communication with the exterior of said suit and including a flexible member, a sleeve carried by said flexible member, and a movable valve element engaged by an edge of said sleeve to seal the latter; said other part having a tubular connector acting when said parts are placed together to sealingly engage said flexible member and to move said valve element to unseat the same with respect to said sleeve edge whereupon said connector is in communication with said chamber.

7. A fitting of the character described comprising two separable parts, one of said parts being adapted to be attached in sealed relationship with a stratosphere or similar suit and having a plurality of chambers therein in communication with the interior of said suit, means normally closing said chambers from communication with the exterior of said suit and including flexible members, sleeves carried by said members, and valve elements engaged by an edge of said sleeves to seal the latter; said other part having tubular connectors acting when said parts are placed together to sealingly engage said flexible members and to unseat said valve elements and sleeve edges whereupon said connectors are in communication with said chambers.

8. A fitting of the character described comprising two separable parts, one of said parts being adapted to be attached in sealed relationship with a stratosphere or similar suit and having a plurality of chambers therein in communication with the interior of said suit, means normally closing said chambers from communication with the exterior of said suit and including flexible members, sleeves carried by said members, and movable valve elements engaged by an edge of said sleeves to seal the latter; said other part having tubular connectors acting when said parts are placed together to sealingly engage said flexible members and to move said valve elements to unseat the latter with respect to said sleeve edges whereupon said connectors are in communication with said chamber.

9. A fitting of the character described comprising two separable parts, one of said parts being adapted to be attached in sealed relationship with a stratosphere or similar suit, said part having a chamber therein communicating with the interior of said suit and also being provided with an opening aligning with said chamber and extending inwardly from the outer side of said part, a flexible member interposed between said chamber and said opening, a sleeve carried by said member, and a valve element normally engaging an edge of said sleeve to close the latter, said other part having a tubular connector extending through said part and projecting when said parts are placed together into said opening and sealingly engaging said flexible member and unseating said valve element and said sleeve edge whereupon said connector is in communication with said chamber.

10. A fitting of the character described comprising two separable parts, one of said parts being adapted to be attached in sealed relationship with a stratosphere or similar suit, said part having a chamber therein communicating with the interior of said suit and also being provided with an opening aligning with said chamber and extending inwardly from the outer side of said part, a flexible member interposed between said opening and said chamber, a sleeve carried by said member, a movable valve element carried by said part and normally engaging an edge of said sleeve to close the latter, said other part supporting a tubular connector extending through the said part and projecting when said parts are placed together into said opening and sealingly engaging the flexible member and moving said valve element to unseat the same with respect to said sleeve edge whereupon said connector is in communication with said chamber.

11. A fitting of the character described comprising two separable parts, one of said parts being adapted to be attached in sealed relationship with a stratosphere or similar suit and having a chamber therein in communication with the interior of said suit, means normally closing said chamber from communication with the exterior of said suit and including a flexible member, a sleeve carried by said flexible member, and a valve element engaged by an edge of said sleeve to seal the latter, said other part having a tubular connector provided with cooperating valve means normally closing the outlet end of the connector, said connector acting when said parts are placed together to sealingly engage said flexible member and to unseat said valve element and sleeve edge whereupon said connector is in communication with said chamber, said one part being provided with means acting when said parts are placed together to unseat said cooperating valve means in said connector.

12. A fitting of the character described comprising two separable parts, one of said parts being adapted to be attached in sealed relationship with a stratosphere or similar suit and having a chamber therein in communication with the interior of said suit, means normally closing said chamber from communication with the exterior of said suit and including a flexible diaphragm, a sleeve carried by said diaphragm, and a fixed valve element engaged by an edge of said sleeve to seal the latter and all carried by said one of said parts, said other part having a tubular connector provided with cooperating valve means normally closing the outlet end of said connector, said connector acting when said parts are placed together to sealingly engage said diaphragm and distort the latter to unseat said sleeve edge and fixed valve element, said one part being provided with means acting when said parts are placed together to unseat the cooperating valve means carried by said tubular connector.

13. A fitting of the character described comprising two separable parts, one of said parts being adapted to be attached in sealed relationship with a stratosphere or similar suit and having a chamber therein in communication with the interior of said suit, means normally closing said chamber from communication with the exterior of said suit and including a flexible member, a sleeve carried by said member, and a movable valve element engaging an edge of said sleeve to seal the latter, said other part having a tubular connector provided with cooperating valve means normally closing the outlet end of said connector, said connector acting when said parts are placed together to sealingly engage said flexible member and to move said valve element to unseat the same with respect to said sleeve edge, said one part being provided with means acting when said parts are placed together to unseat said cooperating valve means carried by said connector.

14. A fitting of the character described comprising two separable parts, one of said parts being adapted to be attached in sealed relationship with a stratosphere or similar suit and having a plurality of chambers therein in communication with the interior of said suit, means normally closing said chambers from communication with the exterior of said suit and including flexible members, sleeves carried by said members, and valve elements engaging an edge of said sleeves to seal the latter, said other part having tubular connectors one of which is provided with cooperating valve means normally closing the outlet end thereof, said connectors acting when said parts are placed together to sealingly engage said members and to unseat said valve elements and sleeve edges, said one part being provided with means acting when said parts are placed together to unseat said cooperating valve means carried by said one connector.

15. A fitting of the character described comprising two separable parts, one of said parts being adapted to be attached in sealed relationship with a stratosphere or similar suit and having a plurality of chambers therein in communication with the interior of said suit, means normally closing said chambers from communication with the exterior of said suit and including flexible diaphragms extending across said chambers, sleeves carried by said diaphragms, and fixed valve elements engaged by an edge of said sleeves to seal the latter, said other part having tubular connectors one of which is provided with cooperating valve means normally closing the outlet end thereof, said connectors acting when said parts are placed together to sealingly engage said diaphragms and distort the latter to unseat said sleeve edges and fixed valve elements, said one part being provided with means acting when said parts are placed together to unseat said cooperating valve means carried by said one connector.

16. A fitting of the character described comprising two separable parts, one of said parts being adapted to be attached in sealed relationship with a stratosphere or similar suit and having a plurality of chambers therein communicating with the interior of said suit, means normally closing said chambers from communication with the exterior of said suit and including flexible members, sleeves carried by said members, and movable valve elements engaging an edge of said sleeves to seal the latter, said other part having tubular connectors one of which is provided with cooperating valve means normally closing the outlet end thereof, said connectors acting when said parts are placed together to sealingly engage said members and to move said valve elements to unseat the same with respect to said sleeve edges, said one part having means acting when said parts are placed together to unseat the cooperating valve means carried by said one connector.

17. A fitting of the character described comprising two separable parts, one of which is operatively attached to a stratosphere or similar suit, one of said parts being provided with a plurality of electrical sockets adapted to be connected to leads and the other of said parts having a plurality of electrical plugs connected to leads and operatively engaging in said sockets when said parts are placed together, the said part other than the part connected to the suit being connected by a conduit to a fluid supply source, said parts having cooperating means releasably interconnecting the parts and placing the interior of the suit in communication with said conduit, said cooperating means including a flexible member, a sleeve carried thereby, and a valve element engaging an edge of said sleeve to seal the latter and all carried by one of said parts, a tubular connector carried by the other of said parts and acting when said parts are interconnected to sealingly engage said member and to unseat said sleeve edge and valve element.

18. A fitting of the character described comprising two separable parts, one of which is operatively attached to a stratosphere or similar suit, one of said parts being provided with a plurality of electrical sockets adapted to be connected to leads and the other of said parts having a plurality of electrical plugs connected to leads and operatively engaging in said sockets when said parts are placed together, the said part other than the part connected to the suit being connected by a conduit to a fluid supply source, said parts having cooperating means releasably interconnecting the parts and placing the interior of the suit in communication with said conduit, said cooperating means including a flexible member, a sleeve carried thereby and a movable valve element engaging an edge of said sleeve to seal the latter and all carried by one of said parts, a tubular connector carried by the other of said parts and acting when said parts are interconnected to sealingly engage said member and to move the valve element to unseat the same with respect to said sleeve edge.

19. A fitting of the character described comprising two separable parts, one of which is operatively attached to a stratosphere or similar suit, one of said parts being provided with a plurality of electrical sockets adapted to be connected to leads and the other of said parts having a plurality of electrical plugs connected to leads and operatively engaging in said sockets when said parts are placed together, the said parts other than the part connected to the suit being connected by conduits to fluid supply sources, said parts having cooperating means releasably interconnecting the parts and placing the interior of the suit in communication with said conduits, said cooperating means including flexible members, sleeves carried by said members and valve elements engaging an edge of said sleeves to seal the latter and all carried by one of said parts, tubular connectors carried by the other of said parts and acting when said parts are interconnected to sealingly engage said members to unseat said sleeve edges and valve elements.

20. A fitting of the character described comprising two separable parts, one of which is operatively attached to a stratosphere or similar suit, one of said parts being provided with a plurality of electrical sockets adapted to be connected to leads and the other of said parts having a plurality of electrical plugs connected to leads and operatively engaging in said sockets when said parts are placed together, the said part other than the part connected to the suit being connected by conduits to fluid supply sources, said parts having cooperating means releasably interconnecting the parts and placing the interior of the suit in communication with said conduits, said cooperating means including flexible members, sleeves carried by said members and valve elements engaging an edge of said sleeves to seal the latter and all carried by one of said parts, tubular connectors carried by the other of said parts and one of which connectors is provided with cooperating valve means normally closing the outlet end thereof, said connectors acting when said parts are interconnected to sealingly engage said members and to unseat said valve elements and sleeeve edges, said one part being provided with means acting when said parts are interconnected to unseat said cooperating valve means carried by said one connector.

JOHN C. CROWLEY.